United States Patent Office 2,714,617
Patented Aug. 2, 1955

2,714,617
PRODUCTION OF CYCLOBUTANO COMPOUNDS

Rex E. Lidov, Denver, Colo., and Henry Bluestone, Shaker Heights, Ohio, assignors, by mesne assignments, to Shell Development Company, Emeryville, Calif., a corporation of Delaware No Drawing. Application January 7, 1953,
Serial No. 330,165

6 Claims. (Cl. 260—648)

The present invention is a continuation-in-part of copending application Serial No. 156,716, filed April 18, 1950, now U. S. Patent No. 2,676,132.

The present invention relates to novel, polycyclic compositions of matter which are unique both as to structure and method of formation. They are cyclobutano compounds containing, in all, seven cycles, and are formed by a single reaction from the tetracyclic compounds, such as 1,2,3,4,10,10-hexachloro-1,4,4a,5,8,8a-hexahydro-1,4,5,8-dimethanonaphthalene described and claimed in the copending application of Rex E. Lidov, Serial No. 325,881, filed December 13, 1952.

The compounds of the present invention are prepared by a novel interaction of the two olefinic linkages in the above mentioned naphthalene. This reaction can be exemplified as follows.

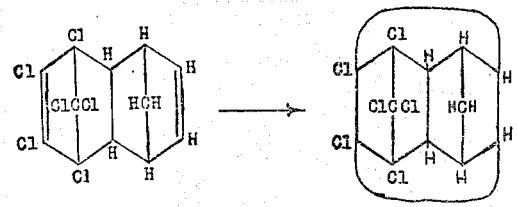

The interaction of the two olefinic linkages results in the formation of a cyclobutane structure which can be more readily visualized in the three dimensional presentation below:

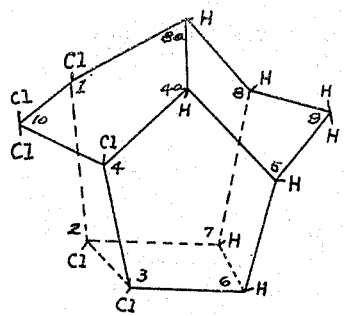

This cyclobutano structure is prepared by reacting the aforesaid 1,2,3,4,10,10-hexachloro-1,4,4a,5,8,8a-hexahydro-1,4,5,8-dimethanonaphthalene or a methyl derivative thereof with hydrogen bromide in the presence of a solvent.

The naphthalene starting material may be prepared from 1,2,3,4,7,7-hexachlorobicyclo-(2.2.1)-2,5-heptadiene by reaction thereof with cyclopentadiene or methyl cyclopentadiene. This reaction and the products formed are described and claimed in said copending Lidov application. The hexachlorobicycloheptadiene is described and claimed in copending application of Henry Bluestone, Serial No. 327,458, filed December 22, 1952.

The following examples illustrate the process of the present invention:

Example I 1,2,3,4,10,10 - hexachloro - 1,4,4a,5,8,8a - hexahydro-1,4,5,8-dimethanonaphthalene (M. P. 240–242° C.; 0.1 mole) (identified in Lidov, Serial No. 325,881, as beta-hexachlorotetracyclododecadiene) was dissolved in 300 ml. of diethyl ether which had been dried for 18 hours over calcium chloride. The solution was held at 20° C. and anhydrous hydrogen bromide was passed into it for a 2-hour period. Concentration of the diethyl ether solution caused the precipitation of a high melting crystalline solid. Repeated recrystallization of this solid from mixtures of acetone and hexane yielded a crystalline product melting, with decomposition, at 288–289° C.

Analysis.—Calculated for $C_{12}H_8Cl_6$: Carbon, 39.49%, hydrogen, 2.2%, chlorine, 58,30%. Found: Carbon, 39.75%, hydrogen, 2.32%, chlorine, 58.3%.

This compound does not undergo reactions of olefins. For example it has a hydrogenation value of zero, does not yield an epoxy derivative, fails to react with stronger oxidizing agents such as $KMnO_4$ and $CrO_3$, fails to add halogens, and does not react with phenyl azide. This compound is the cyclobutano compound previously represented structurally.

Further concentration by evaporation of the diethyl ether mother liquor from which the above product had been separated resulted in the precipitation of a second crop of crystals which, crude, melted over the range of 100–145° C. Recrystallization of this material from a mixture of acetone and hexane produced a white crystalline solid melting at 110–111° C.

Analysis.—Calculated for $C_{12}H_9Cl_6Br$: Carbon 32.32%, hydrogen, 2.03%, halogen calculated as chlorine, 55.67%, Found: Carbon, 32.5%, hydrogen, 2.06%, halogen calculated as chlorine, 55.5%.

This material is therefore 6-bromo-1,2,3,4,10,10-hexachloro - 1,4,4a,5,6,7,8,8a - octahydro - 1,4,5,8-dimethanonaphthalene represented by the following formula:

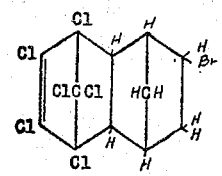

This compound is described and claimed in said Lidov application.

Example II 1,2,3,4,10,10 - hexachloro - 1,4,4a,5,8,8a - hexahydro - 1,4,5,8-dimethanonaphthalene (M. P. 240–242° C.; 0.1 mole) was dissolved in 650 ml. of glacial acetic acid; the solution was heated to about 50° C. and anhydrous hydrogen bromide was passed into it for a period of about three hours. The solution thus obtained was distilled under reduced pressure to remove most of the acetic acid and the HBr dissolved therein. A white crystalline precipitate was obtained from the residual solution. This white crystalline solid was recrystallized from acetone-hexane as before and the crystalline product, melting, with decomposition at 288–289° C. was obtained. This material was identical with the cyclobutano product obtained in Example I.

The reaction of 1,2,3,4,7,7-hexachlorobicyclo-(2.2.1)-2,5-heptadiene with 1-methyl, 2-methyl and 5-methyl-1,3-cyclopentadiene will result in 5-methyl, 6-methyl and 9-methyl derivatives of 1,2,3,4,10,10-hexachloro-1,4,4a, 5,8,8a-hexahydro-1,4,5,8-dimethanonaphthalene having structures as shown below.

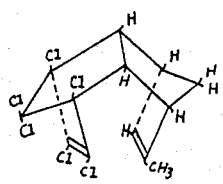

6-methyl compound
(Compound A)

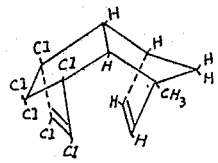

5-methyl compound
(Compound B)

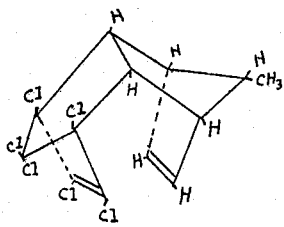

9-methyl compound
(Compound C)

These compounds will each likewise undergo the interaction of the two olefinic bonds in the 2,3 and 6,7 positions respectively when treated with hydrogen bromide in the manner hereinbefore shown to result in the structures represented three dimensionally below:

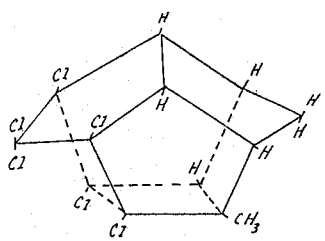

Derived from Compound A

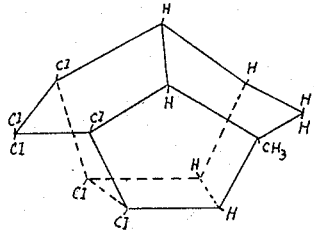

Derived from Compound B

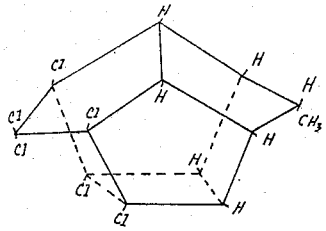

Derived from Compound C

The unique compounds of the present invention are valuable as insecticides. For example, the compound of Example II has exhibited insecticidal potency four times that of DDT.

In addition to their insecticidal activity, the present compounds are useful as impregnants and fire retardants.

In their insecticidal use, the present compounds can be formulated as the sole toxic ingredient or in combination with other insecticides, synergists or knockdown agents. Formulations can be aqueous dispersions, oil solutions, dusts, wettable powders, aerosols, or any other types known in the art.

In the structural diagrams in the foregoing specification and following claims, the dotted lines and solid lines are merely for the purpose of representing three-dimensional configurations and not any difference in the type of bonding between the atoms.

We claim as our invention:

1. As a new composition of matter a compound having the structure:

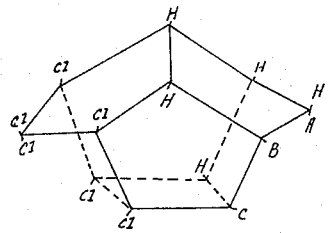

wherein A, B, and C are of the group consisting of hydrogen and methyl, said compound containing not more than one methyl group.

2. As a new composition of matter a compound having the structure:

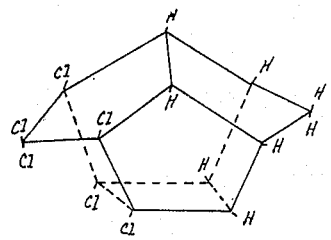

3. As a new composition of matter a compound having the structure:

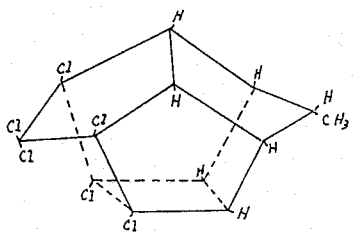

4. As a new composition of matter a compound having the structure:

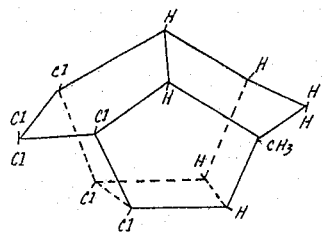

5. As a new composition of matter a compound having the structure:

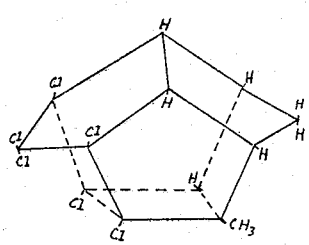

6. The method which comprises heating a compound of the group consisting of (a) 1,2,3,4,10,10-hexachloro-1,4,4a,5,8,8a - hexahydro - 1,4,5,8 - dimethanonaphthalene melting at about 240–242° C., (b) its 5-methyl derivative, (c) its 6-methyl derivative, (d) its 9-methyl derivative with hydrogen bromide in the presence of a solvent and recovering a saturated heptacyclic compound.

References Cited in the file of this patent

UNITED STATES PATENTS

| | | |
|---|---|---|
| 2,635,977 | Lidov | Apr. 21, 1953 |
| 2,635,979 | Lidov | Apr. 21, 1953 |

OTHER REFERENCES

Lidov et al.: "Advances in Chemistry Series," No. 1 (1950), page 177.